United States Patent [19]
Belie et al.

[11] Patent Number: 5,346,162
[45] Date of Patent: Sep. 13, 1994

[54] CARGO COMPARTMENT FOR A LIGHTER-THAN-AIR VEHICLE

[75] Inventors: Robert G. Belie, Moorpark; Leland M. Nicolai, Castaic, both of Calif.

[73] Assignee: Lockheed Corporation, Calabasas, Calif.

[21] Appl. No.: 148,224

[22] Filed: Nov. 8, 1993

[51] Int. Cl.⁵ .............................................. B64C 1/22
[52] U.S. Cl. ............................... 244/137.1; 244/118.1; 244/30
[58] Field of Search ..................... 244/137.1, 118.1, 30, 244/116, 115, 127, 128, 24, 25, 26, 27, 28, 29

[56] References Cited

U.S. PATENT DOCUMENTS 5,143,323  9/1992  Husain ................................. 244/116

FOREIGN PATENT DOCUMENTS 3508100  9/1986  Fed. Rep. of Germany ...... 244/125

Primary Examiner—Michael S. Huppert
Assistant Examiner—Anne E. Bidwell
Attorney, Agent, or Firm—Louis L. Dachs

[57] ABSTRACT

The invention is a cargo compartment for a lighter-than-air vehicle, the vehicle having a longitudinal, vertical and lateral axis. In detail, the cargo compartment includes a cargo carrying structure mounted to the bottom of the vehicle, the structure extending along at least a portion of the longitudinal axis of the vehicle and having a plurality of passageways extending along the longitudinal axis of the vehicle. Each of the passageways is aligned with the lateral axis of the vehicle and extend completely through the structure, and is adapted to simultaneously unload cargo from one end and load cargo from the opposite end. A cargo moving system is mounted in the floor of each passageway for moving the cargo in one end and out the opposite end of the passageway and intermediate positions therebetween. A cargo securing system is mounted on the floor of the passageway for releasable securing the cargo within the passageway at the intermediate positions.

20 Claims, 5 Drawing Sheets

CARGO COMPARTMENT FOR A LIGHTER-THAN-AIR VEHICLE

BACKGROUND OF THE INVENTION

1. Field of the Invention

The invention relates to the field of lighter-than-air vehicles and, in particular, to cargo compartments for such vehicles.

2. Description of Related Art

Lighter-than-air vehicles have either non-rigid or rigid gasbags. There are three general types of non-rigid vehicles: those comprising a single gas filled bag; several gasbags joined together in series; and, of course, those having a multiple number gasbags within a non-rigid envelope. Rigid airships have an internal structure defining the shape of the vehicle containing a plurality of gasbags with an aerodynamic cover there over. One of the problems with both rigid and non-rigid lighter-than-air vehicles is their limited ability to station keep and/or maneuver when docking, especially if there are any significant cross-winds. This is primarily due to their large cross-sectional area, which causes the vehicle to "weather vane" and "wave" with the wind. They are particularly difficult to control if the wind is gusting or when there are significant up or down drafts. In fact, docking has proven to be the most difficult portion of a flight for a lighter-than-air-vehicle. Thus the most common docking procedure is moor the vehicle by its nose and let it weather vane.

In non-rigid designs the cargo flight station and cargo compartments are suspended from the bottom of the vehicle in what is most often referred to as a gondola. In rigid designs, it is also common practice to mount the flight station/passenger and cargo compartments under the gasbag. Unlike a conventional aircraft, the lift forces developed by the gasbag remains when docked. Thus as cargo is unloaded, the net lift force increases. In the past, this increase in net lift has been absorbed by docking restraints, for example mooring lines. If the cargo weight is very large, the force exerted on the mooring lines also becomes large and "station keeping" when docked becomes even more difficult. Therefore, unloading and reloading of cargo sometimes must wait until any winds have sufficiently died down or additional mooring lines must be used to "lock" the vehicle in one position. It is therefore obvious that it is always important to minimize the time spent in such operations.

Thus conventional loading of cargo containers and the like through doors located on the side of the vehicle is too slow and it would be difficult to simultaneously load and unload cargo in order to maintain the gross weight of the vehicle constant. Cargo aircraft, such as the C-5 military transport, have front and rear opening doors to the cargo compartment. However, moving the cargo simultaneously in the front and out the rear of a large lighter-than-air vehicle would still be a difficult and time consuming operation, especially if the cargo compartment is some 600 to 800 feet long. In addition, requiring an uninterrupted passageway over such a length would greatly complicate the design of the gondola. The use of individual cargo compartments located along either side of the vehicle can reduce the cargo loading and unloading time, but does not address the need to maintain a constant payload weight on the vehicle. In U.S. Pat. No. 5,143,323, "Airship Handling System" by F. Husain, et al. a vehicle is disclosed having a cargo/passenger module that is secured in a recess in the gondola. However, properly securing such a module to the gondola is believed to complicate the design of the gondola. In addition, the cargo module would have to be flight certified increasing its cost. In fact, no prior art cargo compartment design has addressed the need to maintain a constant payload weight during loading and unloading of cargo and/or to provide a cargo loading system that minimizes the docking time for unloading and loading cargo.

Therefore, it is a primary object of the invention to provide a cargo compartment for a lighter-than-air vehicle that allows a constant neutral buoyancy to be maintained on the vehicle during loading and unloading thereof.

It is another primary object of the invention to provide a cargo compartment for a lighter-than-air vehicle that provides for simultaneous loading and unloading of cargo while maintaining a constant neutral buoyancy on the vehicle.

It is a further object of the invention to provide a cargo compartment for a lighter-than-air vehicle wherein the cargo can be loaded and unloaded using individual cargo containers.

SUMMARY OF THE INVENTION

The invention is a cargo compartment for a lighter-than-air vehicle, the vehicle having a longitudinal, vertical and lateral axis. The cargo compartment includes a cargo carrying structure mounted to the bottom of the vehicle and which extends along at least a portion of the longitudinal axis thereof. The cargo compartment has a plurality of passageways extending along the longitudinal axis of the vehicle. Each of the passageways is aligned with the lateral axis of the vehicle and extends completely through the cargo compartment, and is adapted to receive at least one cargo container.

A cargo container moving system is mounted in the floor of each passageway for moving the at least one cargo container in one end and out the opposite end of the passageway and to intermediate positions therebetween. The container moving system includes a plurality of powered rollers mounted in the floor of each of the passageways. In addition, the cargo container moving system further includes a plurality of non-powered (passive) rollers mounted in the floor of each of the passageways for movably supporting the at least one cargo container therein.

A cargo container securing system is provided for releasable securing the at least one cargo container within the passageway. The cargo container is provided with a flange along the bottom of the front and rear ends thereof. The cargo securing system further includes a pair of guide rails mounted in a spaced relationship on the floor of the passageway. Thus as the cargo containers are moved into and out of the passageway and to intermediate positions therebetween, the rails engage the flanges on the cargo containers and restrain them from movement along the longitudinal axis of the vehicle. The cargo container securing system further includes a locking system to releasable secure the cargo containers in the intermediate positions along the floor of the passageway preventing movement along the vertical and lateral axis. Although the above described cargo moving and securing systems are preferred, other systems are useable. For example cargo pallets restrained by cargo nets tied down to the passageway floor in combination or air cushion systems for movably supporting the pallets instead of a passive roller system.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
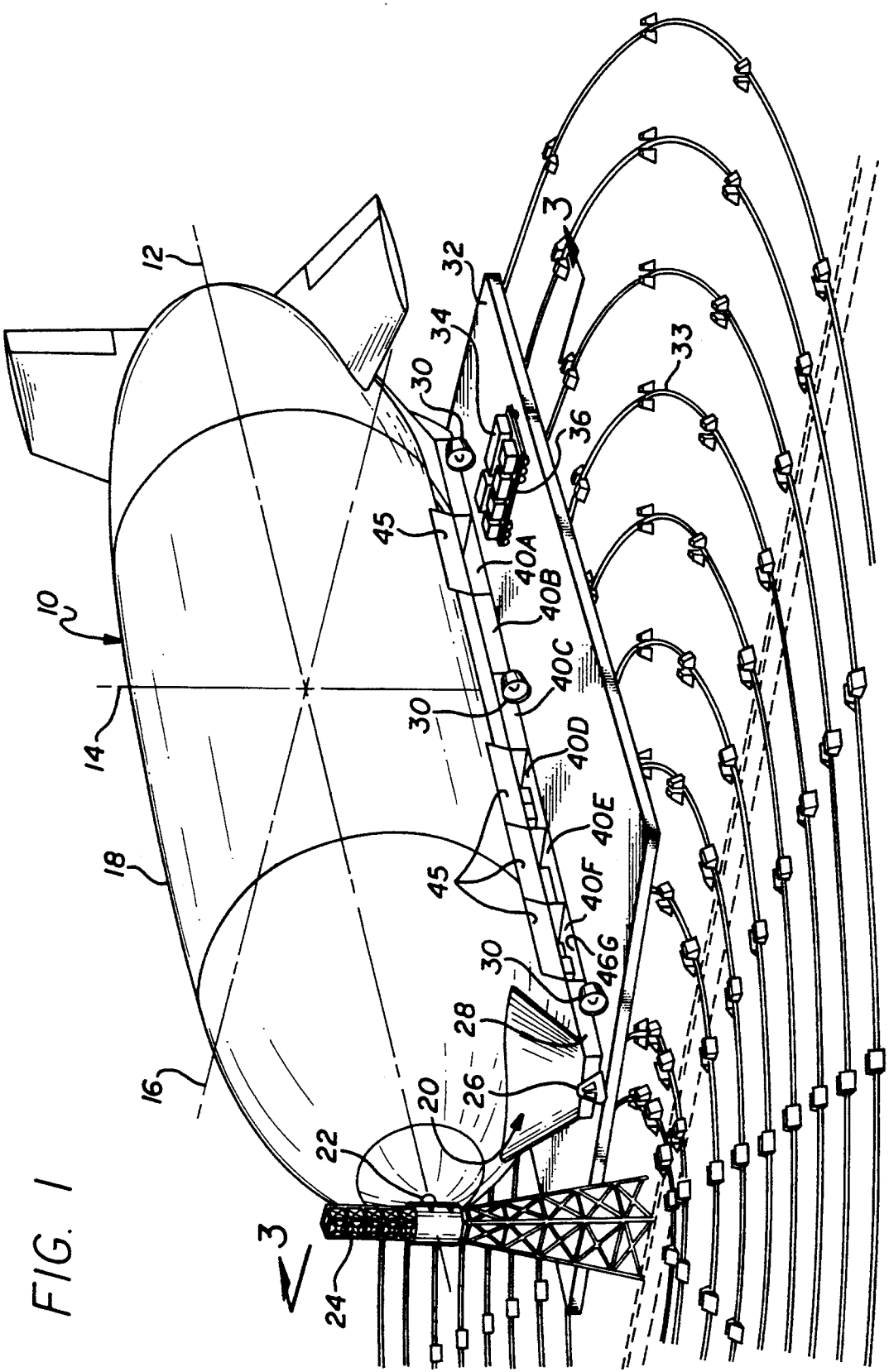
FIG. 1 is a perspective view of a lighter-than-air vehicle, incorporating the subject cargo compartment, shown in the docked position.
Figure 2:
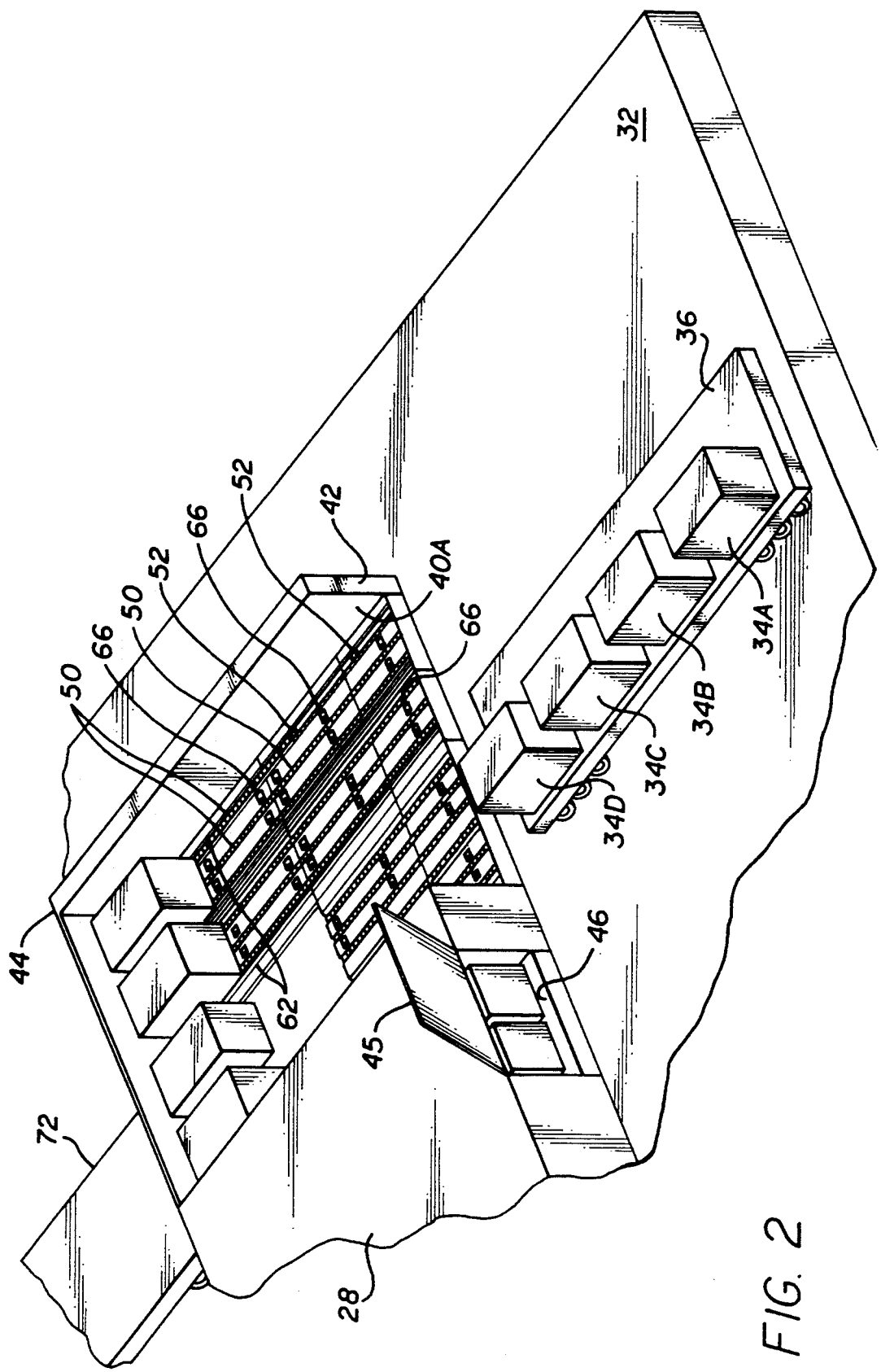
FIG. 2 is partial perspective view partially broken away of the vehicle shown in FIG. 1 providing an interior view of the subject cargo compartment.
Figure 3:
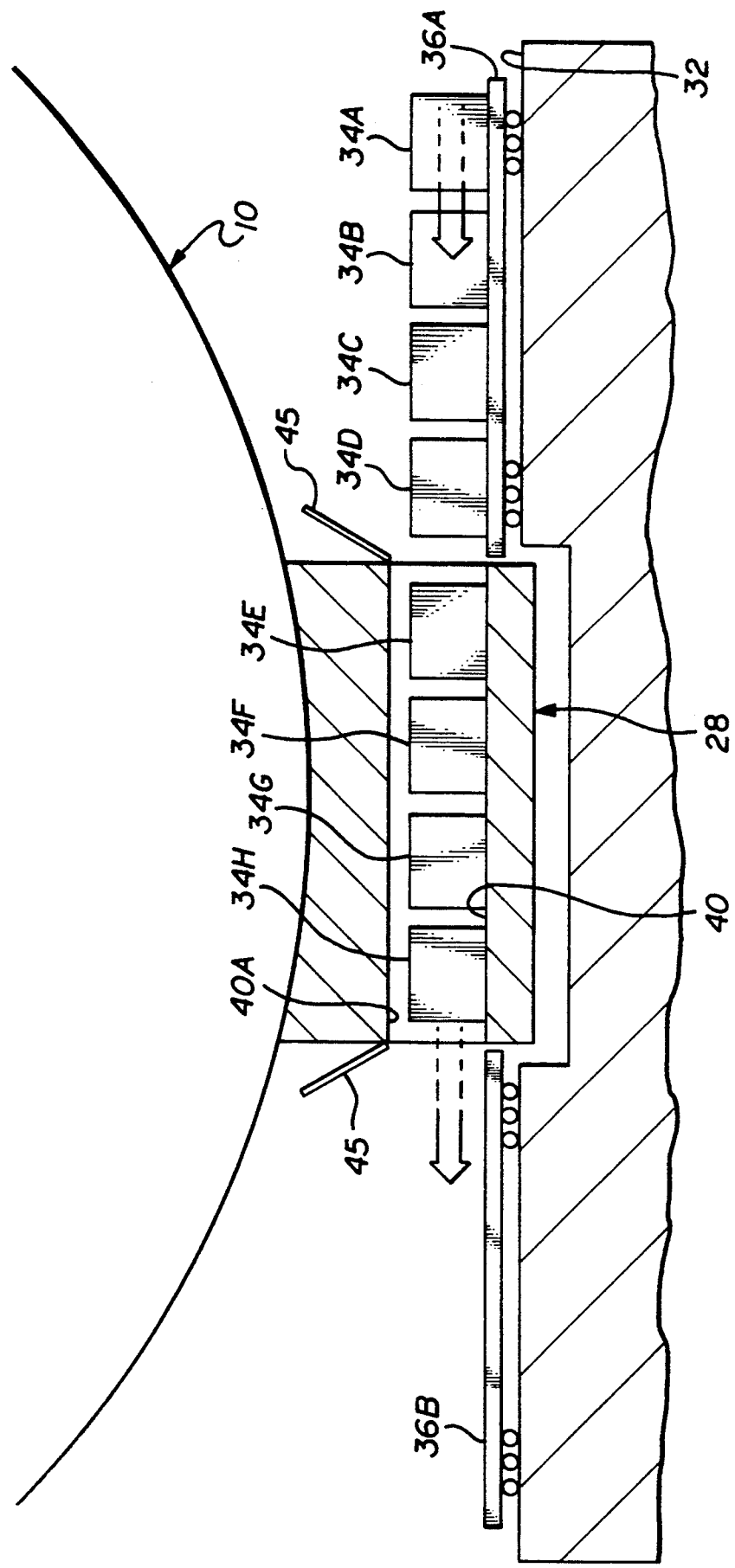
FIG. 3 is partial cross-sectional view of the vehicle shown in FIG. 1 taken along the line 3—3, providing a side view of the subject cargo compartment.
Figure 4:
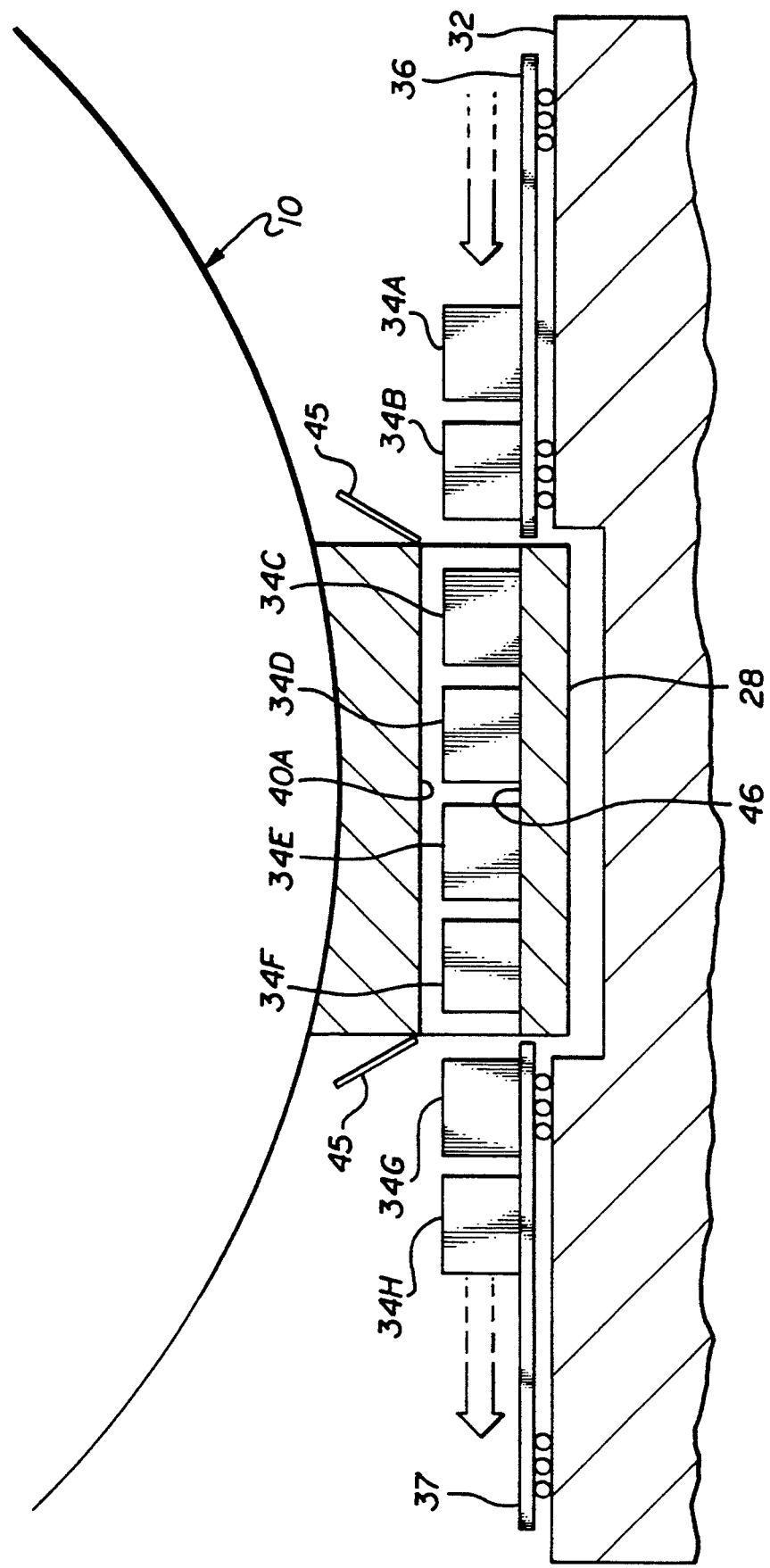
FIG. 4 is a view similar to FIG. 3 illustrating the loading and unloading of cargo containers.

Illustrated in FIG. 1 is a lighter-than-air vehicle incorporating the subject cargo compartment. The vehicle, designated by numeral 10, is a non-rigid design having a longitudinal axis 12, vertical axis 14, and lateral axis 16 and includes a helium bag 18 with a gondola 20, mounted at the bottom. The vehicle 10 is shown in a docked position tethered by its nose 22 to a tower 24. Thus it is free to weather vane in the wind. The gondola 20 includes a flight station 26, and cargo compartment 28 upon which are mounted propulsion systems 30. Whereas a gondola type cargo compartment (suspended cargo compartment) is necessary on a non-rigid vehicle, it is certainly not required on a rigid design. Thus a gondola style cargo compartment is also for purposes of illustration only. A movable platform 32 mounted on a plurality of circularly configured rails 33 is positioned under the vehicle 10 and is movable in a circle about the tower 24. A plurality of cargo containers 34, mounted on a portable loading cart 36, are positioned to be loaded into the cargo compartment 28. Thus the platform 32, with cargo containers 34 thereon, can rotate under power with the vehicle 10, if it "weather vanes".

Still referring to FIG. 1 and additionally to FIGS. 2 through 5, it can be seen that the cargo compartment 28 includes a plurality of passageways 40A–F extending along the longitudinal axis 12. The passageway 40A–F are aligned with the lateral axis 16 and extend completely through the cargo compartment with first and second ends 42 and 44, respectively, having fold up doors 45 attached thereto. The passageways are configured to receive and hold one or more of the cargo containers 34. Because all the passageways 40A–G are basically identical the following remarks shall be directed at just one, 40A. The floor 46 of the passageway 40A contains a plurality of roller assemblies 50 that allow the cargo containers 34 to be "rolled" on to the floor 46 and, in fact, in end 42 when loading and out end 44 when unloading. Although the cargo containers 34 can be pushed or pulled by hand, a plurality of powered roller assemblies 52 are provided in the floor 46 to assist in the movement of the cargo containers 34 in and out of the passageway 40A and intermediate positions therebetween. A suitable powered roller assembly is manufactured by Lucus Western, Incorporated, Electric Systems Division, Brea, Calif.

Figure 5:
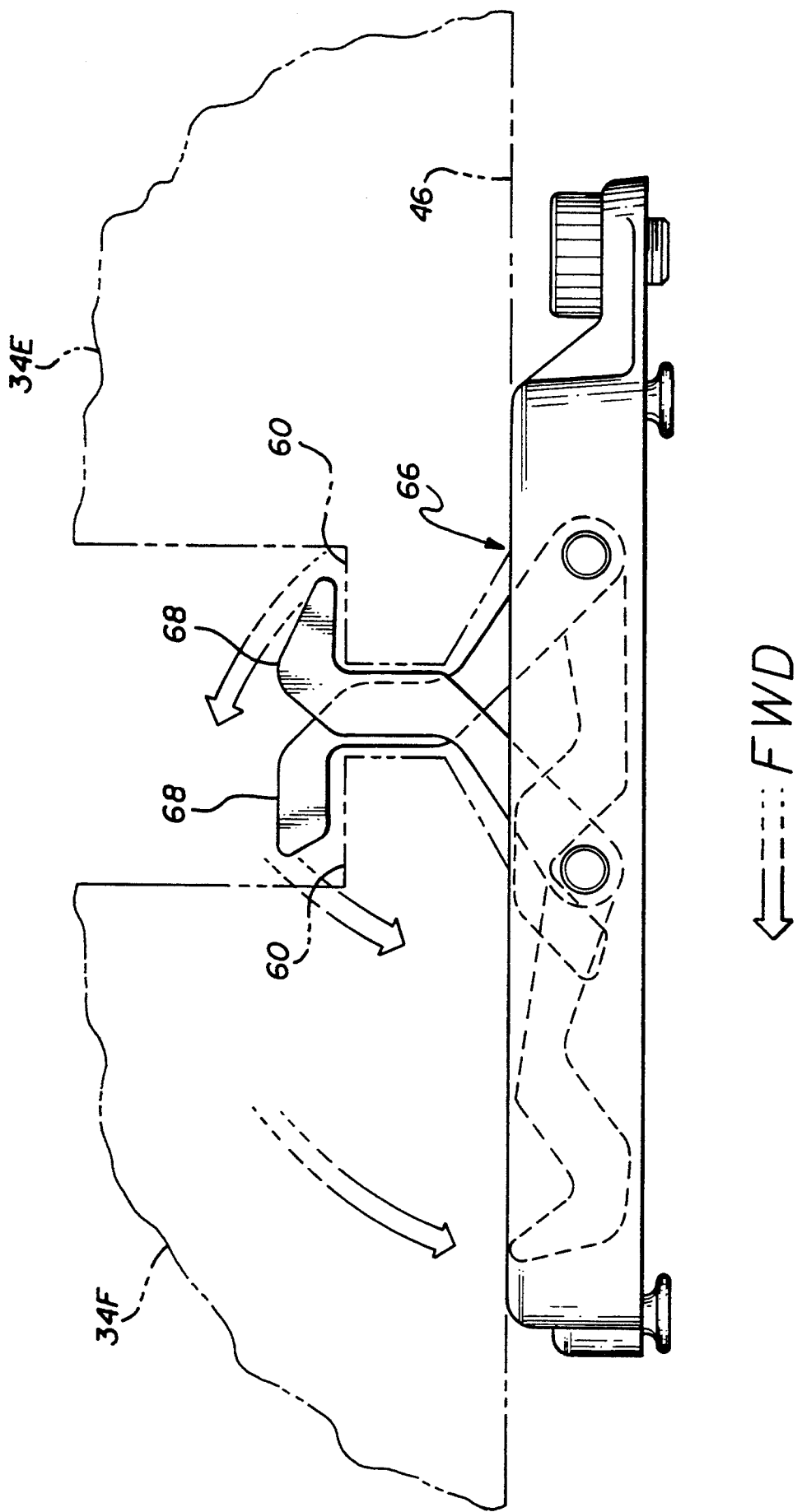
FIG. 5 is an enlarged perspective view of a cargo container tie down device used to secure cargo containers with cargo compartment.

Referring to FIG. 5, to lock the cargo container 34 within the passageway 46A, the container is provided with flanges 60 on the ends thereof. These flanges 60 are adapted to slidably engage guide rails 62 mounted on the floor 46. Thus once the flanges 60 engage the rails 62, the cargo container is restrained from moving along the longitudinal axis 14 of the vehicle (forwards and backwards). Additionally, retractable cargo restraints 66 are provided to restrain the containers 34 movement along the vertical and lateral axis, 14 and 16, respectively (upwards, downwards and from side to side). A suitable cargo restraints 66 can be obtained from Ancra, Corporation, El Segundo, Calif. a combination passive roller tray and cargo restraint is manufactured by Pemco Engineering, Stanton, Calif. Referring particularly to FIG. 5 it can be seen that the cargo restraint 66 includes two restraining "hooks" 68 that engage the flanges 60 on two adjacent cargo containers 34. Note again that this particular restraint is only illustrative and there are numerous other types that may be used in this application.

Referring back to FIGS. 1–4, in operation, the vehicle 10 is first docked with the nose 22 moored to the tower 24 and positioned over the platform 32. The vehicle 10 is secured to the platform 32 by mooring lines (not shown). Cargo containers 34A–D are positioned on a cart 36 in proximity to the end 42 of the passageway. The cart 36 includes cargo moving systems similar to those found in the passageways 40. An empty cart 72 is shown positioned on the opposite end 44 of the passageway 40. With the doors 45 opened, the cargo containers 34A–D are moved off the cart 36 into the passageway 40, while cargo containers 34E–H are simultaneously removed from the passageway onto cart 72. Note that, while only one cart 36 is shown, it is envisioned that all the passageways 40A–G would be simultaneously unloaded and loaded. Thus a constant payload weight is always maintained, balancing the lift forces generated by the airbag 18. Of course, the individual weight of the loaded cargo containers must be known so that they can be matched with the container being unloaded. In addition, the normal center of gravity shifts must be considered, as in the case of conventional aircraft. If the total weight of the new cargo is dramatically different from that being off loaded, then containers loaded with ballast (not shown) may have to be used. Such a case would occur if the cargo being unloaded were automobiles and cut flowers were being loaded.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry and, in particular to manufactures of lighter-than-air vehicles.

We claim:

1. A cargo compartment for a lighter-than-air vehicle, the vehicle having a longitudinal, vertical and lateral axis, the cargo compartment comprising:

a cargo carrying structure mounted to the bottom of the vehicle, said structure extending along at least a portion of the longitudinal axis of the vehicle and having a plurality of open ended passageways, each having a floor, and extending along the longitudinal axis of the vehicle, each of said passageways aligned with the lateral axis of the vehicle and extending completely through said structure, said passageways adapted to simultaneously off load cargo from one end of said passageway and to on load cargo from the opposite end;

first means mounted in each passageway for moving the cargo in one end and out the opposite end of said passageway and intermediate positions therebetween; and second means for releasable securing the cargo within said passageway.

2. The cargo compartment as set forth in claim 1 wherein the cargo is mounted within at least one cargo container, said compartment further comprising:

said first means adapted to move said at least one cargo container in one end and out the opposite end of said passageway and intermediate positions therebetween; and said second means adapted to releasable secure the cargo container within said passageway.

3. The cargo compartment as set forth in claim 2 wherein said first means is mounted on said floor of each passageway.

4. The cargo compartment as set forth in claim 3 wherein said second means is mounted on said floor of each passageway.

5. The cargo compartment as set forth in claim 4 wherein said first means includes a plurality of powered rollers mounted in said floor of each of said passageways for moving the at least one cargo container in one end and out the other end of said passageway and intermediate positions therebetween.

6. The cargo compartment as set forth in claim 5 wherein said first means further comprises a plurality of non-powered rollers mounted in said floor of each of said passageways for movably supporting the at least one cargo container.

7. The cargo compartment as set forth in claim 2, or 3, or 4, or 5, or 6 further comprising said second means including a pair of guide rails mounted in a spaced relationship on said floor of said passageway, such that said at least one cargo container is moved into and out of said passageway and to said intermediate positions therein, said rails engage said at least one cargo container and restrain it from movement along longitudinal axis of the vehicle.

8. The cargo compartment as set forth in claim 7 further comprising said second means including locking means to releasable secure at least one cargo container in said intermediate positions along said floor of said passageway from movement along the vertical and lateral axis of the vehicle.

9. The cargo compartment as set forth in claim 8 further comprising doors mounted on each end of said passageways for sealing of the interior thereof.

10. A cargo compartment for a lighter-than-air vehicle, the vehicle having a longitudinal, vertical and lateral axis, the cargo compartment comprising:

a cargo carrying structure mounted to the bottom of the vehicle, said structure extending along at least a portion of the longitudinal axis of the vehicle and having a plurality of open ended passageways, each having a floor, and extending along the longitudinal axis of the vehicle, each of said passageways aligned with the lateral axis of the vehicle and extending completely through said structure, said passageways adapted to simultaneously off load cargo from one end of said passageway and to on load cargo from the opposite end.

11. The cargo compartment as set forth in claim 10 comprising first means mounted in each passageway for moving the cargo in one end and out the opposite end of said passageway and intermediate positions therebetween.

12. The cargo compartment as set forth in claim 11 comprising second means for releasable securing the cargo within said passageway.

13. The cargo compartment as set forth in claim 12 wherein the cargo is mounted within at least one cargo container, said compartment further comprising:

said first means adapted to move the at least one cargo container in one end and out the opposite end of said passageway and intermediate positions therebetween; and said second means adapted to releasable secure the at least one cargo container within said passageway.

14. The cargo system as set forth in claim 13 wherein said first means is mounted on the floor of each passageway.

15. The cargo compartment as set forth in claim 14 wherein said second means is mounted on the floor of each passageway.

16. The cargo compartment as set forth in claim 15 wherein said first means includes a plurality of powered rollers mounted in said floor of each of said passageways for moving the at least one cargo container in one end and out the other end of said passageway and intermediate positions therebetween.

17. The cargo compartment as set forth in claim 16 wherein said first means further comprises a plurality of non-powered rollers mounted in said floor of each of said passageways for movably supporting the at least one cargo container.

18. The cargo compartment am set forth in claim 13, or 14, or 15, or 16, or 17 further comprising said second means including a pair of guide rails mounted in a spaced relationship on said floor of said passageway, such that, as the at least one cargo container is moved into and out of said passageway and to said intermediate positions therein, said rails engage the at least one cargo container and restrain it from movement along longitudinal axis of the vehicle.

19. The cargo compartment as set forth in claim 18 further comprising said second means including locking means to releasable secure the at least one cargo container in said intermediate positions along said floor of said passageway from movement along the vertical and lateral axis of the vehicle.

20. The cargo compartment as set forth in claim 19 further comprising doors mounted on each end of said passageways for sealing of the interior thereof.

* * * * *